No. 759,513. PATENTED MAY 10, 1904.
H. FRAHM.
APPARATUS FOR MEASURING THE REVOLUTIONS OF ROTATING SHAFTS.
APPLICATION FILED AUG. 28, 1902.
NO MODEL.

Witnesses:
Paul Wollenberg.
Arthur Scholz.

Inventor
Hermann Frahm.
by [signature]
Attorney.

No. 759,513. Patented May 10, 1904.

UNITED STATES PATENT OFFICE.

HERMANN FRAHM, OF HAMBURG, GERMANY.

APPARATUS FOR MEASURING THE REVOLUTIONS OF ROTATING SHAFTS.

SPECIFICATION forming part of Letters Patent No. 759,513, dated May 10, 1904.

Application filed August 28, 1902. Serial No. 121,382. (No model.)

*To all whom it may concern:*

Be it known that I, HERMANN FRAHM, a subject of the King of Prussia, German Emperor, and a resident of 14 Holstenplatz, Hamburg-on-the-Elbe, German Empire, have invented a new and useful Apparatus for Measuring the Revolutions of Rotating Shafts, of which the following is an exact specification.

My invention relates to an apparatus for measuring the revolutions of shafts. The apparatus is built upon the physical principle consisting in the peculiar circumstance that elastic materials, as springs, strings, or the like, begin to oscillate in case small forces act upon them in certain intervals, which intervals correspond to the period of oscillation of of the material. If now small forces are imparted in certain intervals from a rotating shaft in any convenient manner to a plurality of springs each of which has a different predetermined period of oscillations, the revolutions of the shaft can be determined by finding out that spring the natural oscillations of which correspond to the intervals in which the forces are imparted to the springs or strings by means of the rotating shaft—that is to say, by finding out that spring to which the largest oscillations are imparted by means of the forces acting in the same manner upon all the springs or strings. It has been found out by experiences that the simplest and best way to impart the small forces to the springs, strings, or the like is to oscillate the fixed ends of the same in a slight way.

In order to make my invention more clear, I refer to the accompanying drawings, in which—

Figure 1:
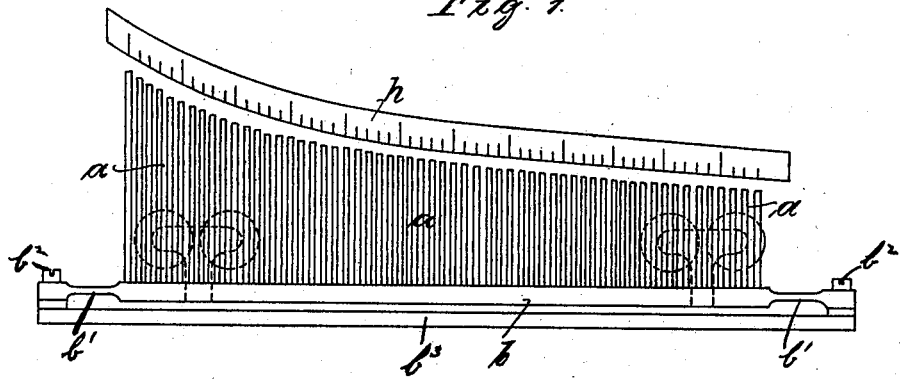
Figure 1:
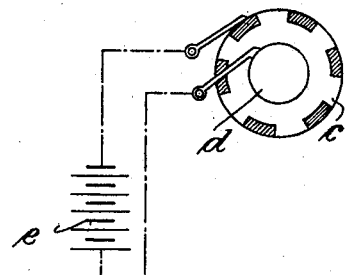
Figure 2:
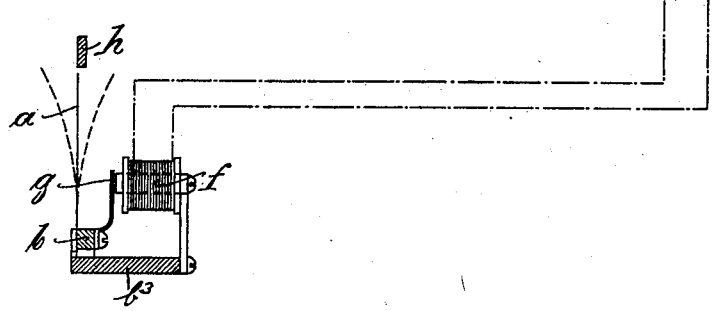

Figure 1 is a front view of my apparatus. Fig. 2 is a side view of the same.

$a$ represents springs with different natural oscillations. These different natural oscillations can be attained by different lengths of the springs or different diameters and shapes of the same. The springs $a$ are advantageously fixed to an oscillating metal piece $b$, so that all the springs are oscillated in the same manner by oscillating this metal piece $b$. The metal piece $b$ can be oscillated from a rotating shaft in any convenient manner. In the example shown in the drawings electricity is used for oscillating the metal piece $b$.

In the drawings, $c$ is a disk provided with several contact-pieces, which disk is fixed to the rotating shaft $d$, the revolutions of which shall be measured, so that during the revolutions of the shaft $d$ a circuit is closed by means of the disk $c$ in certain intervals. The current which derives from the battery $e$ and which is interrupted and closed in certain intervals by means of the disk $c$ is led around an electromagnet $f$, so that by means of the magnetism produced in the moment in which the current is closed an armature $g$ is attracted. This armature $g$ is fixed to the metal piece $b$. This metal piece consists of a middle part having a square section, to which middle part the springs $a$ are fixed. Adjacent to this middle part parts $b'$, having a smaller section, are situated, which parts $b'$ are elastic, so as to allow an oscillating of the middle part $b$. The ends of the piece $b$ are rigidly fixed, by means of screws $b^2$, to a foundation-plate $b^3$. If by the armature $g$ being alternately attracted and released by the electromagnet $f$ the middle part of the metal piece $b$ on account of the elastic parts $b'$ of the same begins to oscillate, the springs $a$ will also begin to oscillate. That spring the period of oscillations of which corresponds to the intervals between the oscillations imparted to the metal piece $b$ will have the largest oscillations. As it can easily be seen during the working of the device which spring has the largest oscillations, the number of rotations of the shaft $d$ can be easily determined.

The number of revolutions of the shaft corresponding to the natural period of oscillations of each spring may be printed upon each spring or a scale $h$, containing the number of revolutions, may be situated above or at the side of the springs $a$.

It will be understood that instead of using interrupted continuous currents for oscillating the piece $b$ alternating currents may be used.

Having thus fully described the nature of this invention, what I desire to secure by Letters Patent of the United States is—

1. In an apparatus for measuring the numbers of revolutions of rotating shafts, the combination of a metal piece $b$ capable of being oscillated, elastic springs $a$ of different natural oscillations fixed to the metal piece $b$, and means for oscillating the metal piece $b$ from the rotating shaft, the number of revolutions of which shall be measured, substantially as described and for the purpose set forth.

2. In an apparatus for measuring the numbers of revolutions of rotating shafts, the combination of a metal piece $b$ capable of being oscillated, elastic springs $a$ of different natural oscillations fixed to the metal piece $b$, a source of electricity, means for interrupting the circuit of the source of electricity by means of the rotating shaft, the revolutions of which shall be measured, an electromagnet situated in the circuit of the source of electricity and an armature for said electromagnet, said armature being fixed to the metal piece $b$, substantially as described and for the purpose set forth.

In testimony whereof I have signed my name to this specification in the presence of two subscribing witnesses.

HERMANN FRAHM.

Witnesses:
E. H. L. MUMMENHOFF,
T. CHRIST. HAFERMANN.